United States Patent
Vosz

(10) Patent No.: US 8,035,532 B2
(45) Date of Patent: Oct. 11, 2011

(54) VEHICLE LOCATION BASED PARTICULATE MATTER FILTER REGENERATION

(75) Inventor: Adam Vosz, Shelby Township, MI (US)

(73) Assignee: GM Global Technology Operations LLC

( * ) Notice: Subject to any disclaimer, the term of this patent is extended or adjusted under 35 U.S.C. 154(b) by 456 days.

(21) Appl. No.: 12/261,334

(22) Filed: Oct. 30, 2008

(65) Prior Publication Data

US 2010/0109911 A1    May 6, 2010

(51) Int. Cl.
*G08B 21/00*    (2006.01)

(52) U.S. Cl. .......................... 340/932.2; 60/277; 60/295

(58) Field of Classification Search .................. 340/439, 340/607, 932.2; 60/274, 277, 295; 701/201
See application file for complete search history.

(56) References Cited

U.S. PATENT DOCUMENTS

| | | | |
|---|---|---|---|
| 2005/0166580 A1* | 8/2005 | Pfaeffle et al. | 60/295 |
| 2008/0178576 A1* | 7/2008 | Meier et al. | 60/277 |

* cited by examiner

*Primary Examiner* — Jeffery Hofsass

(57) ABSTRACT

A regeneration control system for a vehicle comprises a regeneration control module and a disabling module. The regeneration control module selectively initiates a regeneration of a particulate matter filter of the vehicle. The disabling module selectively disables the regeneration control module based on a location of the vehicle provided by a global positioning system (GPS).

16 Claims, 3 Drawing Sheets

VEHICLE LOCATION BASED PARTICULATE MATTER FILTER REGENERATION

FIELD

The present disclosure relates to particulate matter filters in vehicles and more particularly to systems and methods for controlling regeneration of particulate matter filters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engines typically produce torque more efficiently than gasoline engines. This increase in efficiency may be due to an increased compression ratio and/or the combustion of diesel fuel, which has a higher energy density than that of gasoline. The combustion of diesel fuel produces particulate. The particulate is filtered from exhaust by a diesel particulate filter (DPF). Other engine systems may also include a particulate matter (PM) filter. With time, the PM filter may fill with particulate and restrict the flow of the exhaust. The particulate is combusted through a process referred to as regeneration.

Regeneration may be accomplished via heat provided by, for example, combustion of the diesel fuel, a catalyst located upstream of the PM filter, and/or a heater that is associated with the PM filter. For example, fuel may be injected into the exhaust stream. One or more catalysts may be disposed in the exhaust stream and may combust the injected fuel. The combustion of the fuel by the catalysts generates heat, thereby increasing the temperature of the exhaust. The increased temperature of the exhaust combusts the particulate trapped in the PM filter.

SUMMARY

A regeneration control system for a vehicle comprises a regeneration control module and a disabling module. The regeneration control module selectively initiates a regeneration of a particulate matter filter of the vehicle. The disabling module selectively disables the regeneration control module based on a location of the vehicle provided by a global positioning system (GPS).

In other features, the regeneration control system further comprises a location identification module. The location identification module identifies expected parking locations for the vehicle and selectively outputs a parking indicator based on the vehicle location and at least one of the expected parking locations. The disabling module disables the regeneration control module when the parking indicator is output.

In further features, the location identification module outputs the parking indicator when the vehicle location is less than a predetermined distance from one of the parking locations.

In other features, the location identification module identifies one of the expected parking locations based on a desired location input by a driver of the vehicle.

In still other features, the location identification module identifies the expected parking locations based on stored vehicle locations at or near which at least one of the vehicle was parked and an engine of the vehicle was shut down.

In further features, the regeneration control system further comprises an off-road identification module. The off-road identification module selectively outputs an off-road indicator based on the vehicle location and a database of roadways. The disabling module disables the regeneration control module when the off-road indicator is output.

In still further features, the off-road identification module outputs the off-road indicator when the vehicle location is greater than a predetermined distance from a nearest one of the roadways.

In other features, the regeneration control system further comprises an overriding module. The overriding module overrides the disabling module and enables the regeneration control module when particulate matter loading of the particulate matter filter is greater than a predetermined loading amount.

In further features, the regeneration control module initiates the regeneration when the particulate matter loading is greater than the predetermined loading amount.

In still further features, the disabling module also disables said regeneration control module when a fuel level of said vehicle is less than a predetermined fuel level.

A method for a vehicle comprises selectively initiating regeneration of a particulate matter filter of the vehicle using a regeneration control module and selectively disabling the regeneration control module based on a location of the vehicle provided by a global positioning system (GPS).

In other features, the method further comprises identifying expected parking locations for the vehicle and selectively outputting a parking indicator based on the vehicle location and at least one of the expected parking locations. The selectively disabling comprises disabling the regeneration control module when the parking indicator is output.

In further features, the selectively outputting the parking indicator comprises outputting the parking indicator when the vehicle location is less than a predetermined distance from one of the parking locations.

In other features, the identifying the expected parking locations comprises identifying one of the expected parking locations based on a desired location input by a driver of the vehicle.

In still other features, the identifying the expected parking locations comprises identifying the expected parking locations based on stored vehicle locations at or near which at least one of the vehicle was parked and an engine of the vehicle was shut down.

In further features, the method further comprises selectively outputting an off-road indicator based on the location of the vehicle and a database of roadways. The selectively disabling comprises disabling the regeneration control module when the off-road indicator is output.

In still further features, the selectively outputting the off-road indicator comprises outputting the off-road indicator when the vehicle location is greater than a predetermined distance from a nearest one of the roadways.

In other features, the method further comprises overriding the selectively disabling and enabling the regeneration control module when particulate matter loading of the particulate matter filter is greater than a predetermined loading amount.

In further features, the method further comprises initiating the regeneration when the particulate matter loading is greater than the predetermined loading amount.

In still further features, the method further comprises disabling the regeneration control module when a fuel level of the vehicle is less than a predetermined fuel level.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
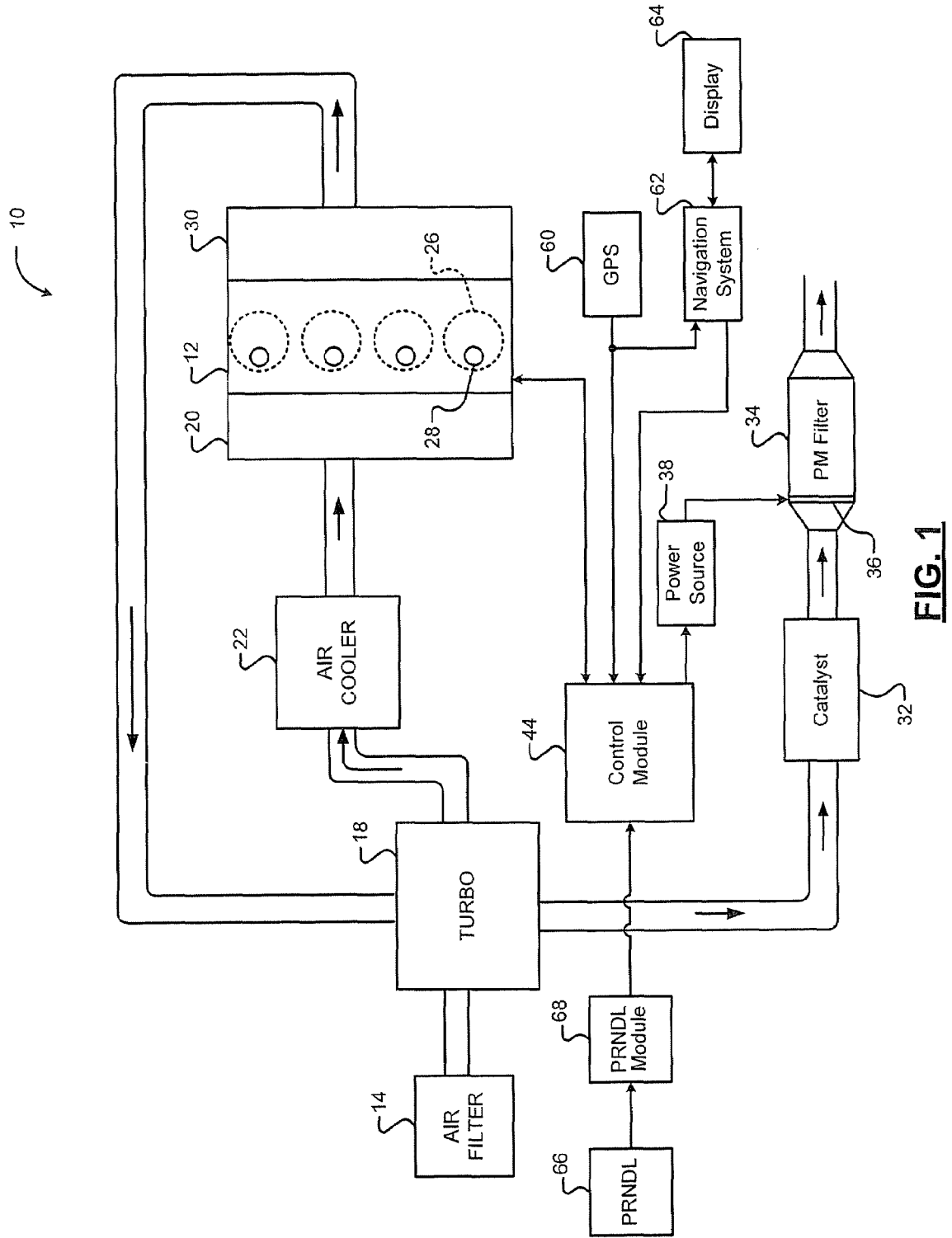
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Regeneration control systems selectively initiate and control regeneration of particulate matter filters in vehicles. A regeneration control system according to the principles of the present application selectively disables regeneration of a particulate matter filter based on a vehicle location provided by a global positioning system (GPS).

More specifically, the regeneration control system disables regeneration of the particulate matter filter when the vehicle is located less than a predetermined distance from an expected parking location. In this manner, the regeneration control system disables regeneration of the particulate matter filter at times when there may be insufficient time to complete regeneration.

The regeneration control system also disables regeneration of the particulate matter filter when the vehicle is off-road. In other words, the regeneration control system disables regeneration of the particulate matter filter when the vehicle is more than a predetermined distance from a road-way or other surface designated for vehicle use. The regeneration control system may also disable regeneration of the particulate matter filter when the vehicle is on a dirt roadway.

The regeneration control system also selectively enables regeneration of the particulate matter filter based on the amount of particulate matter stored within the particulate matter filter (i.e., particulate matter loading). The regeneration control system selectively enables the regeneration of the particulate matter filter even when regeneration is disabled due to the relationship between the vehicle location and the roadways and/or the expected parking locations. In this manner, the regeneration control system selectively overrides vehicle location based disabling of regeneration based on the particulate matter loading. For example only, the regeneration control system enables regeneration of the particulate matter filter when the particulate matter loading is greater than the predetermined loading amount.

Referring now to FIG. 1, a functional block diagram of an exemplary engine system 10 is presented. A regeneration control system according of the present application may be implemented in any suitable engine system having a PM filter. For example only, the regeneration control system may be implemented in a gasoline-type internal combustion engine system, a diesel-type internal combustion engine system, a hybrid-type engine system, and/or any other suitable type of engine system. For ease of discussion only, the principles of the present disclosure will be discussed in the context of a diesel-type engine system.

The diesel engine system 10 includes an engine 12 that combusts an air and fuel mixture to produce drive torque for a vehicle. The vehicle may be any suitable type of transportation including, but not limited to, a traditional automobile, an agricultural vehicle, an air-borne vehicle, and/or a marine vehicle. Air passes through an air filter 14 and may be drawn into a turbocharger 18. While the diesel engine system 10 is depicted as including the turbocharger 18, the diesel engine system 10 may be supercharged or naturally aspirated.

The turbocharger 18 selectively compresses air entering the diesel engine system 10. More specifically, the turbocharger 18 provides a compressed air charge to an intake manifold 20. The compressed air from the turbocharger 18 may be passed through an intercooler 22 before being provided to the intake manifold 20.

Air within the intake manifold 20 is distributed to one or more cylinders 26 of the engine 12. Although four cylinders 26 are illustrated, the engine 12 may include any suitable number of cylinders including, but not limited to 1, 2, 3, 4, 5, 6, 8, 10, 12 and/or 16 cylinders. It should also be appreciated that the engine 12 may be implemented in any suitable type of configuration, such as a "V"-type configuration.

Fuel injected by fuel injectors 28 mixes with the air and forms an air/fuel mixture. The fuel injectors 28 inject fuel at any suitable location, such as directly into the cylinders 26 as shown in FIG. 1. In other implementations, the fuel injectors 28 inject fuel near intake valves associated with the cylinders 26 and/or into the intake manifold 20.

Combustion of the air/fuel mixture may be initiated in any suitable manner. For example only, combustion of the air/fuel mixture may be initiated by heat produced via compression. Combustion of the air/fuel mixture generates torque that is used to propel the vehicle. Combustion of the air/fuel mixture also produces exhaust.

Exhaust is expelled from the cylinders 26 of the engine 12 to an exhaust system. The exhaust system includes an exhaust manifold 30, a diesel oxidation catalyst (DOC) 32, and a PM filter 34. For example only, the PM filter 34 may be a diesel particulate filter (DPF). The exhaust system may also include an exhaust gas recirculation (EGR) valve (not shown) that directs exhaust back to the intake manifold 20. While not shown, the exhaust system may also include one or more additional DOCs, catalysts (e.g., a selective catalytic reduction catalyst), and/or one or more nitrous oxide (NOx) traps. The exhaust is expelled from the cylinders 26 to the exhaust manifold 30. The flow of the exhaust may be used to drive the turbocharger 18.

The exhaust flows from the turbocharger 18 to the DOC 32. The DOC 32 oxidizes various components of the exhaust. For example only, the DOC 32 may oxidize hydrocarbons and/or carbon oxides in the exhaust. The exhaust flows from the DOC 32 to the PM filter 34. The PM filter 34 filters particulate matter from the exhaust. Particulate matter is stored and accumulates within the PM filter 34 until the particulate matter is burned during regeneration.

Regeneration of the PM filter 34 may be initiated in any suitable manner. For example only, regeneration may be initiated by heat provided by combustion of the air/fuel mixture, the DOC 32, and/or any other suitable heat source. In various implementations, a heater 36 may be implemented with the PM filter 34 to provide heat and initiate regeneration. A power source 38 selectively provides power to the heater 36.

Regeneration begins when particulate matter located near an inlet of the PM filter 34 is combusted. Heat generated by the combustion of particulate matter near the inlet of the PM filter 34 is carried by the exhaust to an outlet of the PM filter 34. In this manner, particulate matter located throughout the PM filter 34 is combusted and removed from the PM filter 34.

A control module 44 communicates with the power source 38, a global positioning system (GPS) 60, and a navigation system 62. The control module 44 also communicates with one or more sensors associated with the PM filter 34. For example only, the sensors may include one or more temperature and/or pressure sensors.

The control module 44 determines an amount of particulate matter stored within the PM filter 34 (i.e., particulate matter loading) based on various exhaust parameters. For example only, the control module 44 may determine the particulate matter loading based on the temperature and pressure of the exhaust measured upstream and downstream of the PM filter 34.

The GPS 60 monitors the location of the vehicle and outputs a location signal corresponding to the vehicle location. The control module 44 receives the location signal from the GPS 60. The navigation system 62 also receives the location signal. The navigation system 62 includes a database of roadways and other surfaces designated for vehicle use.

The navigation system 62 displays the vehicle location with respect to the roadways using a display 64. The navigation system 62 may also display other information, such as orientation of the vehicle, direction and rate of travel, and/or any other suitable information. A user of the vehicle may input data to the navigation system 62 via the display 64, such as a desired location. In various implementations, the GPS 60 and the navigation system 62 may be implemented within one system.

A driver of the vehicle selects a mode of operation for the vehicle via a park, reverse, neutral, drive lever (PRNDL) 66. For example only, the mode of operation may be a park mode, a reverse mode, a neutral mode, or a drive mode. A PRNDL module 68 monitors the PRNDL 66 and generates a mode signal corresponding to the mode of operation selected by a driver. The control module 44 may control the engine 12 and/or other vehicle systems (e.g., a transmission system) based on the selected mode of operation.

The control module 44 selectively initiates regeneration of the PM filter 34. For example only, the control module 44 may initiate regeneration based on the particulate matter loading, the exhaust flow rate, and/or any other suitable parameter. The control module 44 may initiate regeneration by, for example, commanding the power source 38 to supply power to the heater 36. The control module 44 may also increase fuel provided to the engine 12 and/or command injection of fuel into the exhaust system for regeneration.

The control module 44 also controls the duration of regeneration. For example only, the control module 44 controls the duration of regeneration based on the particulate matter loading and/or the exhaust flow rate. For example only, duration may increase as the particulate matter loading increases and/or as the exhaust flow rate decreases.

The control module 44 according to the principles of the present application selectively disables regeneration of the PM filter 34 based on the vehicle location provided by the GPS 60. The control module 44 stores the vehicle location each time that the driver selects the park mode of operation via the PRNDL 66. Additionally or alternatively, the control module 44 may store the vehicle location when the engine 12 is shut down. The control module 44 may also store the vehicle location between locations at which the vehicle is parked and/or shut down. These vehicle locations may be used to establish a route between these locations. The control module 44 may in turn estimate when to regenerate the PM filter 34 when the vehicle is traveling a route.

The control module 44 disables regeneration of the PM filter 34 when the vehicle is less than a predetermined distance from a location at which the control module 44 expects that the vehicle will be parked. In this manner, the control module 44 prevents initiating a regeneration of the PM filter 34 at a time when regeneration might not have sufficient time to complete. Disabling regeneration at such times increases fuel efficiency.

The navigation system 62 indicates when the vehicle leaves the roadways. In other words, the navigation system 62 indicates when the vehicle travels off-road. For example only, the navigation system 62 may indicate that the vehicle is off-road when the vehicle is more than a predetermined distance from a nearest one of the roadways or other surface designated for vehicle use. In other implementations, the navigation system 62 may also indicate that the vehicle is off-road when the vehicle is located on a dirt roadway.

The control module 44 according to the principles of the present disclosure disables regeneration of the PM filter 34 when the vehicle is located off of the roadways and other surfaces designated for vehicle use. In this manner, the control module 44 prevents a regeneration at a time when the vehicle could be located in an area of vegetation.

The control module 44 may also disable regeneration of the PM filter 34 when a fuel level is low. For example only, the control module 44 may disable regeneration when the fuel level in a fuel tank (not shown) is less than a predetermined level. Disabling regeneration when the fuel level is low may prevent regenerating the PM filter 34 shortly before the driver stops to refill the fuel.

The control module 44 also selectively overrides any disabling of regeneration and initiates regeneration of the PM filter 34 when the particulate matter loading is greater than a predetermined loading amount. More specifically, the control module 44 selectively initiates a regeneration even when the vehicle is within the predetermined distance of an expected parking location and/or when the vehicle is located off of the roadways.

Figure 2:
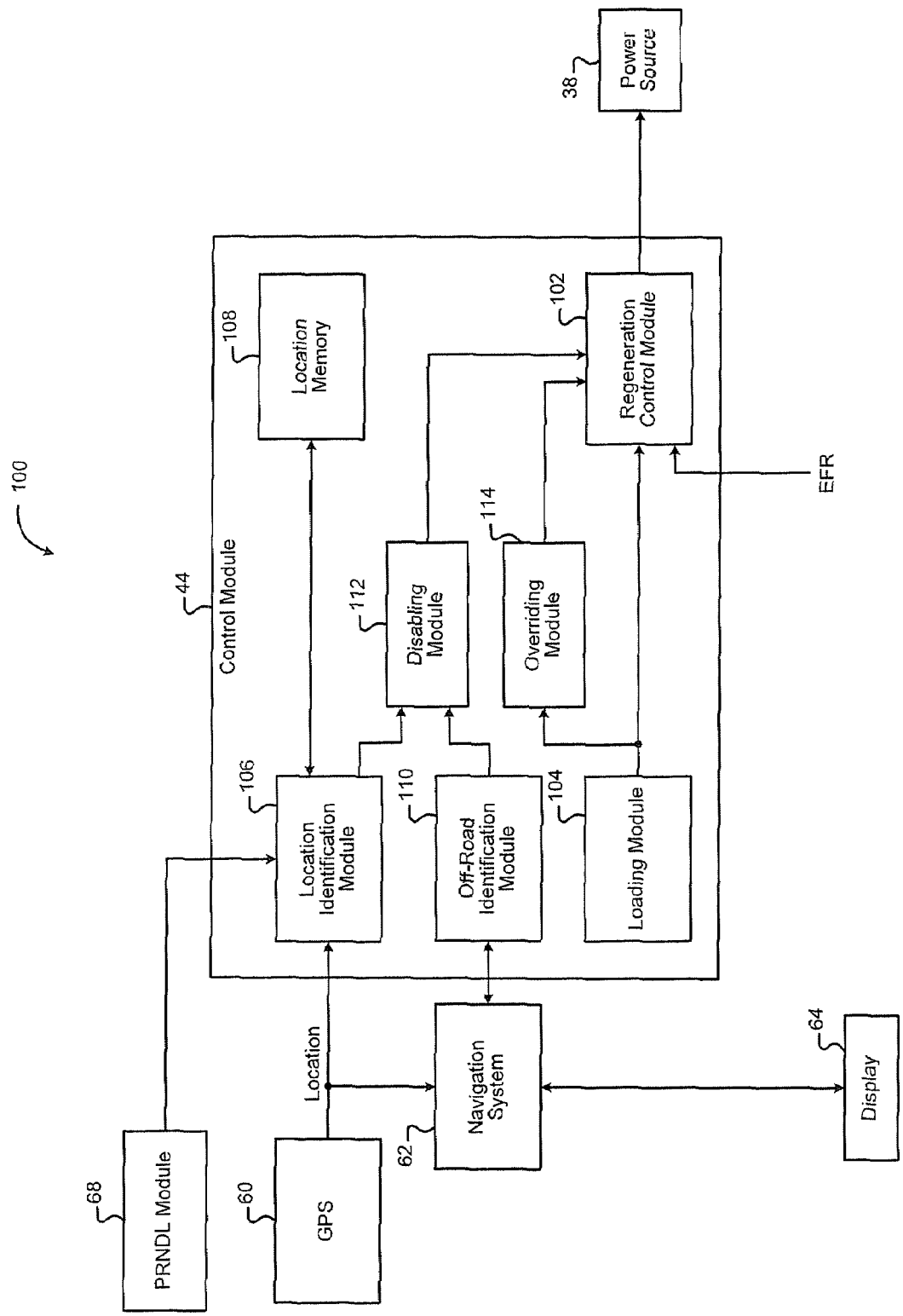
FIG. 2 is a functional block diagram of an exemplary regeneration control system according to the principles of the present disclosure.

Referring now to FIG. 2, a functional block diagram of an exemplary implementation of a regeneration control system 100 is presented. The GPS 60 monitors location of the vehicle and outputs the location signal accordingly. For example only, the GPS 60 may determine the vehicle location based on data provided by a satellite system. The vehicle location may include, for example, a zip code, a county, an address, a locational coordinate (e.g., longitude and latitude), and/or any other suitable locational parameter.

The control module 44 includes a regeneration control module 102 and a loading module 104. The control module 44 also includes a location identification module 106, location memory 108, and an off-road identification module 110.

Additionally, the control module 44 includes a disabling module 112 and an overriding module 114.

The regeneration control module 102 selectively initiates a regeneration of the PM filter 34. The regeneration control module 102 may initiate a regeneration of the PM filter 34 based on any suitable parameters, such as the particulate matter loading and the exhaust flow rate (EFR). For example only, the regeneration control module 102 may initiate regeneration when the particulate matter loading is greater than a predetermined loading amount and the EFR is greater than a predetermined EFR. The regeneration control module 102 may initiate a regeneration by, for example, applying power to the heater 36 via the power source 38 and/or supplying fuel downstream of the engine 12.

The loading module 104 determines the particulate matter loading in any suitable manner. For example only, the loading module 104 may determine the particulate matter loading based on the signals provided by various sensors, such as upstream and downstream temperature and pressure sensors. The EFR may be received from any suitable source, such as an EFR sensor (not shown). In other implementations, the EFR may be estimated based on the mass flowrate of air (MAF) into the engine 12, the air/fuel mixture, engine speed, and/or any other suitable parameter.

The location identification module 106 receives the location signal from the GPS 60. The location identification module 106 also receives the mode signal from the PRNDL module 68 corresponding to the mode of operation selected by the driver. The location identification module 106 stores the vehicle location when the driver selects the park mode of operation. The location identification module 106 may also store the vehicle location when the engine 12 is shut down and/or when the driver inputs a desired location. The location identification module 106 may store the vehicle location in any suitable location, such as in the location memory 108. In this manner, the location memory 108 includes vehicle locations at which the vehicle has been parked.

The location identification module 106 identifies expected parking locations based on the stored vehicle locations. In other words, the location identification module 106 identifies locations at or near which the driver may park the vehicle. For example only, the location identification module 106 may identify a location as being an expected parking location when the driver has parked the vehicle at or near the location on a predetermined number of occasions. Such identified locations would also include locations at which the driver has parked the vehicle in the same parking lot or parking area on the predetermined number of occasions. Exemplary expected parking locations include, for example, a home location, a work location, a school location, a shopping location, etc.

The location identification module 106 selectively generates and outputs a parking signal based on the location of the vehicle and the expected parking locations. More specifically, the location identification module 106 generates the parking signal when regeneration should be disabled due to the vehicle location with respect to one or more of the expected parking locations.

For example only, the location identification module 106 may generate the parking signal when the vehicle is less than a predetermined distance from at least one of the expected parking locations. In various implementations, the location identification module 106 may require that the vehicle be traveling toward one of the expected parking locations before generating the parking signal. The location identification module 106 may also require that the vehicle substantially travel a stored route that the driver has previously used to travel to that expected parking location before generating the parking signal. The location identification module 106 may generate the parking signal when the vehicle is located less than the predetermined distance from a desired location input by the driver.

The navigation system 62 includes a database of roadways and other surfaces designated for vehicle use. The off-road identification module 110 selectively generates and outputs an off-road signal based on the location of the vehicle with respect to the database of roadways and other surfaces. More specifically, the off-road identification module 110 generates the off-road signal when the vehicle is more than a predetermined distance from a nearest one of the roadways. In this manner, the off-road identification module 110 indicates when the vehicle is off-road. In other implementations, the off-road signal may be provided by the navigation system 62 and/or any other suitable module or system.

The disabling module 112 selectively disables the regeneration control module 102 based on the location of the vehicle. More specifically, the disabling module 112 selectively disables the regeneration control module 102 based on the vehicle location with respect to the expected parking locations and/or the roadways. In this manner, the disabling module 112 selectively disables regeneration of the PM filter 34.

The disabling module 112 disables the regeneration control module 102 when the parking signal and/or the off-road signal is output. In other words, the disabling module 112 disables the regeneration control module 102 when the vehicle is off-road. The disabling module 112 also disables the regeneration control module 102 when the vehicle is within a predetermined distance of at least one of the expected parking locations.

The overriding module 114, however, selectively overrides the disabling module 112 and enables the regeneration control module 102. In other words, the overriding module 114 selectively enables regeneration of the PM filter 34 despite the vehicle location. The overriding module 114 selectively overrides the disabling module 112 based on the particulate matter loading.

For example only, the overriding module 114 may override the disabling module 112 when the particulate matter loading is greater than the predetermined loading amount. When the disabling module 112 is overridden, the regeneration control module 102 initiates regeneration of the PM filter 34 regardless of any disabling.

Figure 3:
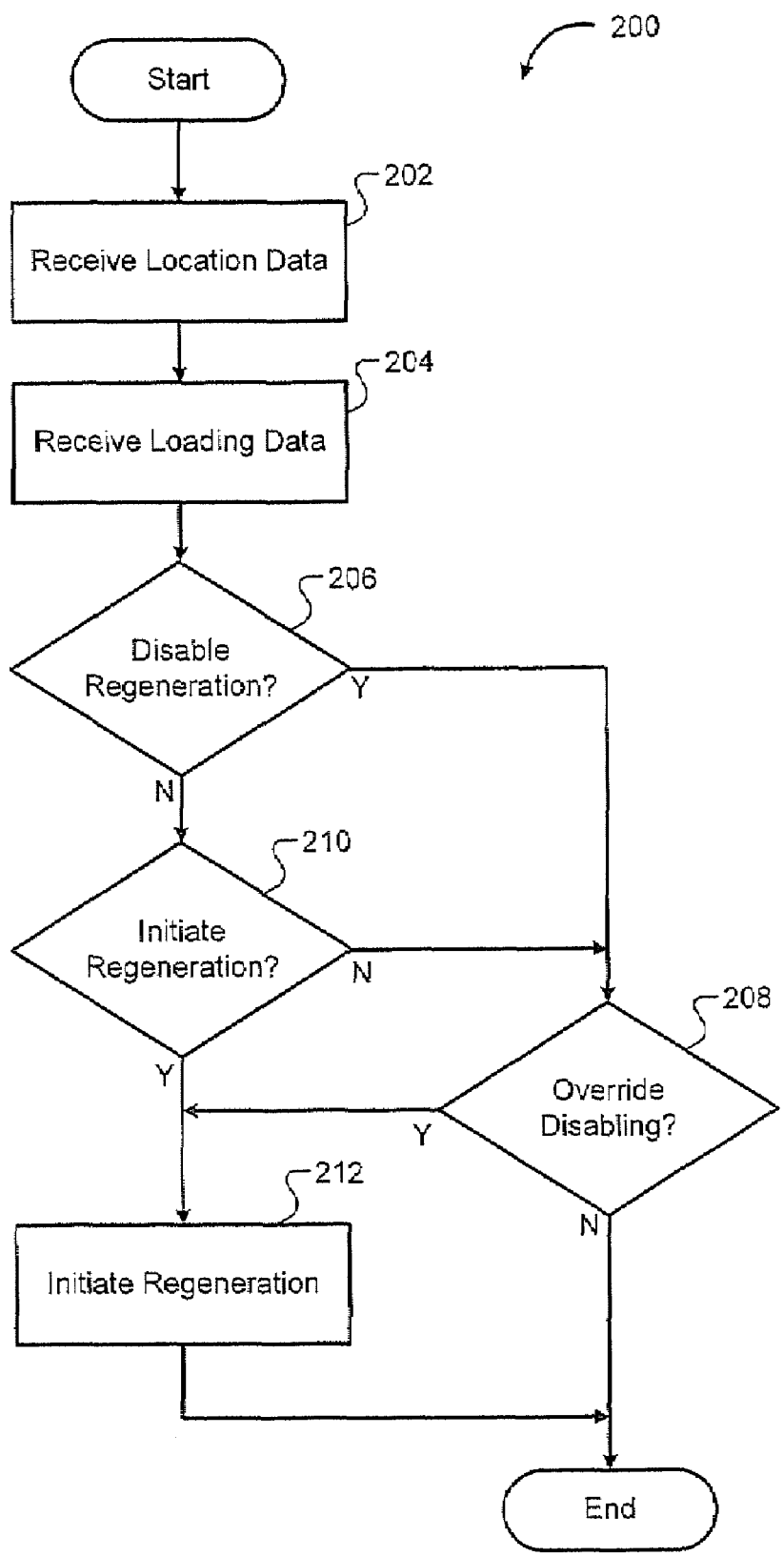
FIG. 3 is a flowchart depicting exemplary steps performed by the regeneration control system according to the principles of the present disclosure.

Referring now to FIG. 3, a flowchart depicting exemplary steps 200 performed by the regeneration control system 100 is presented. Control begins in step 202 where control receives the vehicle location data. For example only, the GPS 60 may determine the vehicle location based on data provided by a satellite system.

Control continues in step where control receives particulate matter loading data in step 204. The particulate matter loading may be determined in any suitable manner. Control continues to step 206 where control determines whether to disable regeneration of the PM filter 34. If true, control transfers to step 208; if false, control proceeds to step 210.

Control determines whether to disable regeneration of the PM filter 34 based on the location of the vehicle. More specifically, control determines whether to disable regeneration of the PM filter 34 based on the vehicle location with respect to the roadways and/or the expected parking locations.

For example only, control may disable regeneration of the PM filter 34 when the vehicle is located more than a predetermined distance from a nearest one of the roadways, when the vehicle is located less than a predetermined distance from at least one of the expected parking locations, and/or when the vehicle is less than a predetermined distance from a desired location input by the driver. Control may also disable regeneration of the PM filter 34 when the vehicle is traveling toward one of the expected parking locations and/or when the vehicle substantially travels a stored route that the driver has previously used to travel to an expected parking location.

In step 210, control determines whether to initiate regeneration. If true, control continues to step 212 where control initiates regeneration of the PM filter 34. If false, control ends. Control may determine whether to initiate regeneration in any suitable manner, for example, based on the EFR and the particulate matter loading. Control may initiate regeneration in any suitable manner, such as by supplying power to the heater 36 and/or supplying fuel downstream of the engine 12.

In step 208 (i.e., where control has determined to disable regeneration), control determines whether to override the disabling of regeneration. If true, control transfers to step 210; if false, control ends. Control determines whether to override the disabling based on the particulate matter loading. For example only, control may override the disabling when the particulate matter loading is greater than the predetermined loading amount. While the exemplary steps 200 of FIG. 3 are shown and described as ending after either step 212 or step 208 is performed, control may instead return to step 202.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A regeneration control system for a vehicle, comprising:
   a regeneration control module that selectively initiates a regeneration of a particulate matter filter of said vehicle;
   a disabling module that selectively disables said regeneration control module based on a location of said vehicle provided by a global positioning system (GPS); and
   a location identification module that identifies expected parking locations for said vehicle based on stored vehicle locations at or near which at least one of said vehicle was parked and an engine of said vehicle was shut down and that selectively outputs a parking indicator based on said vehicle location and at least one of said expected parking locations,
   wherein said disabling module disables said regeneration control module when said parking indicator is output.

2. The regeneration control system of claim 1 wherein said location identification module outputs said parking indicator when said vehicle location is less than a predetermined distance from one of said parking locations.

3. The regeneration control system of claim 1 wherein said location identification module identifies one of said expected parking locations based on a desired location input by a driver of said vehicle.

4. A regeneration control system for a vehicle, comprising:
   a regeneration control module that selectively initiates a regeneration of a particulate matter filter of said vehicle;
   a disabling module that selectively disables said regeneration control module based on a location of said vehicle provided by a global positioning system (GPS); and
   an off-road identification module that selectively outputs an off-road indicator based on said vehicle location and a database of roadways,
   wherein said disabling module disables said regeneration control module when said off-road indicator is output.

5. The regeneration control system of claim 4 wherein said off-road identification module outputs said off-road indicator when said vehicle location is greater than a predetermined distance from a nearest one of said roadways.

6. The regeneration control system of claim 1 further comprising an overriding module that overrides said disabling module and enables said regeneration control module when particulate matter loading of said particulate matter filter is greater than a predetermined loading amount.

7. The regeneration control system of claim 6 wherein said regeneration control module initiates said regeneration when said particulate matter loading is greater than said predetermined loading amount.

8. The regeneration control system of claim 1 wherein said disabling module also disables said regeneration control module when a fuel level of said vehicle is less than a predetermined fuel level.

9. A method for a vehicle, comprising:
   selectively initiating regeneration of a particulate matter filter of said vehicle using a regeneration control module;
   selectively disabling said regeneration control module based on a location of said vehicle provided by a global positioning system (GPS);
   identifying expected parking locations for said vehicle based on stored vehicle locations at or near which at least one of said vehicle was parked and an engine of said vehicle was shut down; and
   selectively outputting a parking indicator based on said vehicle location and at least one of said expected parking locations,
   wherein said selectively disabling comprises disabling said regeneration control module when said parking indicator is output.

10. The method of claim 9 wherein said selectively outputting said parking indicator comprises outputting said parking indicator when said vehicle location is less than a predetermined distance from one of said parking locations.

11. The method of claim 9 wherein said identifying said expected parking locations comprises identifying one of said expected parking locations based on a desired location input by a driver of said vehicle.

12. A method for a vehicle, comprising:
   selectively initiating regeneration of a particulate matter filter of said vehicle using a regeneration control module;
   selectively disabling said regeneration control module based on a location of said vehicle provided by a global positioning system (GPS); and
   selectively outputting an off-road indicator based on said location of said vehicle and a database of roadways,
   wherein said selectively disabling comprises disabling said regeneration control module when said off-road indicator is output.

13. The method of claim 12 wherein said selectively outputting said off-road indicator comprises outputting said off-road indicator when said vehicle location is greater than a predetermined distance from a nearest one of said roadways.

14. The method of claim 9 further comprising overriding said selectively disabling and enabling said regeneration control module when particulate matter loading of said particulate matter filter is greater than a predetermined loading amount.

15. The method of claim 14 further comprising initiating said regeneration when said particulate matter loading is greater than said predetermined loading amount.

16. The method of claim 9 further comprising disabling said regeneration control module when a fuel level of said vehicle is less than a predetermined fuel level.

* * * * *